United States Patent [19]

Nazer

[11] 4,406,208

[45] Sep. 27, 1983

[54] MUSIC TEACHING AID

[76] Inventor: Ralph Nazer, 1450 Palisade Ave., Ft. Lee, N.J. 07024

[21] Appl. No.: 342,173

[22] Filed: Jan. 25, 1982

[51] Int. Cl.³ .............................................. G09B 15/00
[52] U.S. Cl. ...................................... 84/453; 84/465; 84/484
[58] Field of Search .................... 84/422 R, 453, 465, 84/484; 272/96

[56] References Cited

U.S. PATENT DOCUMENTS 3,122,961 3/1964 Gornston et al. .................... 84/484
4,141,273 2/1979 Austin .................................. 84/484

FOREIGN PATENT DOCUMENTS 597169 5/1960 Canada ................................. 84/484

Primary Examiner—Lawrence R. Franklin
Attorney, Agent, or Firm—Natter & Natter

[57] ABSTRACT

A music teaching device for coordinating oscillatory downward and upward foot movement with basic musical time divisions includes a platform providing a primary foot impact surface. The platform has a detachable subassembly including a pair of upstanding posts and a removable heel block. The posts support an upper and a lower horizontal resistance bar in adjustably spaced relationship above the platform. The lower resistance bar is spring urged toward the platform and provides a secondary impact surface for use in teaching duple meter. An upper resistance bar functions as a tertiary impact surface when used together with the lower resistance bar for demonstrating triple meter.

12 Claims, 5 Drawing Figures

U.S. Patent  Sep. 27, 1983  Sheet 2 of 2  4,406,208
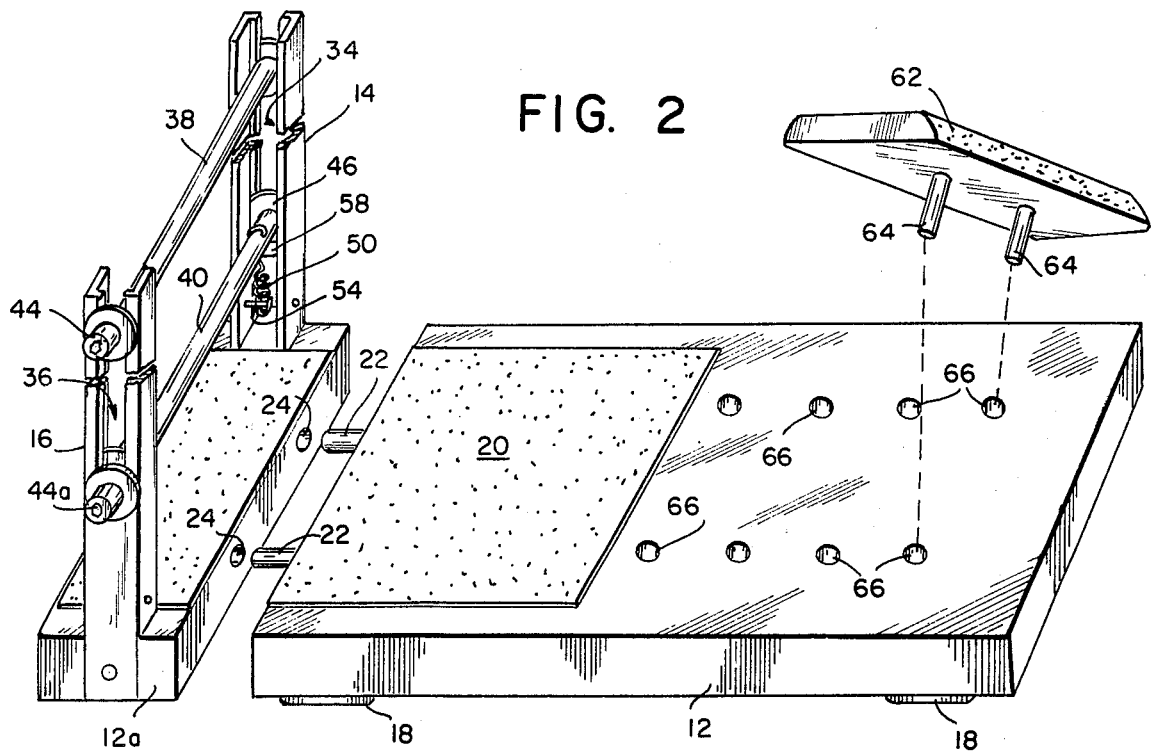
FIG. 2
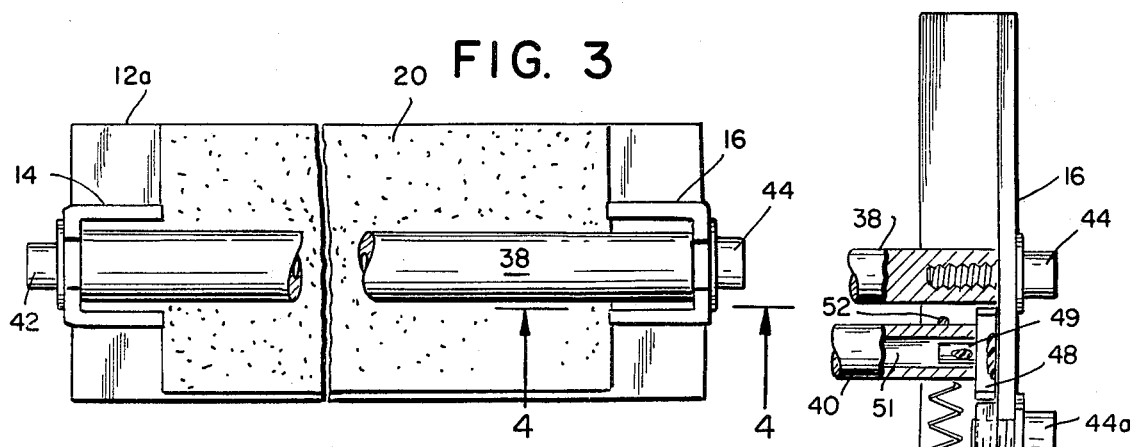
FIG. 3
FIG. 4
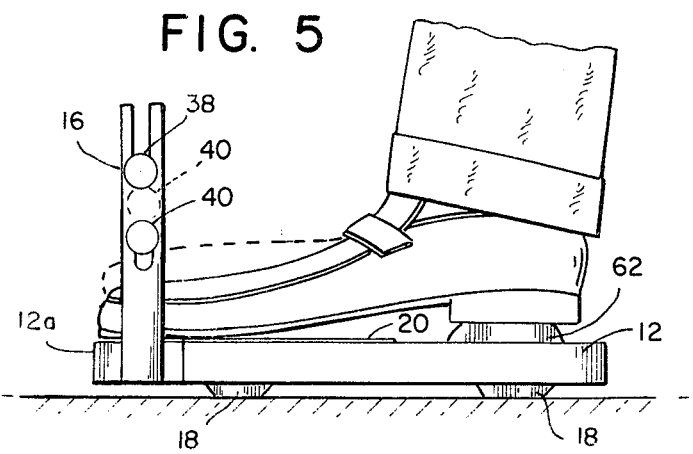
FIG. 5

MUSIC TEACHING AID

TECHNICAL FIELD

This invention concerns a pedagogical device and especially a remedial aid for teaching a student to understand and feel the pulsations of time characteristic of music.

In particular, the music teaching aid of this invention relates to a student activated mechanical analog for simulating metrical pulses.

BACKGROUND ART

An important aspect in learning to play a musical instrument is for the student to appreciate and experience the basic divisions of musical meter. One of the principal devices which was utilized for teaching the proper timing in music was the self-powered metronome. The metronome utilized a pendulum action wherein the timing was dependent upon the position of a weight on the pendulum. A problem with this device, however, was that it was not under the direct and continuous control of the student; hence he did not have the "feel" of the beat. Consequently, those mechanical time beating devices did not adequately advance the student's musical comprehension.

Other devices of the prior art included instruments mechanically operated by the student as by the application of foot or hand pressure which produced an audible signal; examples of such devices were shown in U.S. Pat. Nos. 2,223,668 and 3,122,961. The reliance upon an audible time signal had distinct shortcomings in that it did not adequately instill a consciousness for the beat. Furthermore, it was impractical for the student, while playing a musical instrument, to at the same time listen for the audible time beating device, or alternatively the sound emissions were distracting the student.

Another device used in teaching music was shown in U.S. Pat. No. 2,471,990. That device was intended for use conjointly with the teacher, and consequently a drawback was that its application for self-instruction was severely limited.

The present invention, in contrast, solves the aforementioned problems involved in the prior art with a mechanical time beating device which improves upon the natural and instinctive way to keep time to music, i.e. by tapping one's foot on a firm surface. This has been accomplished by the application of the rhythmic foot movement within a yieldable boundary limiting structure for defining both downward and upward toe displacement.

It should be noted that, although some devices had utilized an upward toe movement, for example as shown in U.S. Pat. Nos. 3,863,916 and 4,262,576, those devices were not intended for and did not have the instructional capacity of this invention. Furthermore, another disadvantage of the aforementioned devices was that they were incapable of stimulating basic time divisions in music both in duple and triple meter.

DISCLOSURE OF THE INVENTION

Briefly, the nature of this invention involves a foot actuated device, the purpose of which is to help a student play a musical instrument in a rhythmically correct manner and further to increase the student's sight reading capabilities.

The gist of the invention concerns a structural counterpart for independently denoting a musical beat. The apparatus provides selective impact surfaces for delimiting the amplitude of physical rhythmic displacement and thereby permitting the student to coordinate his movement in conformity with the basic time divisions.

The apparatus for achieving these results includes a platform providing a primary impact surface. The platform has a detachable subassembly and a pair of upstanding support posts with horizontal resistance bars slidably mounted therebetween. A lower resistance bar is spring urged toward the platform and can be fixedly secured at desired elevations above the platform to provide a secondary impact surface. The student beats time to the music with his foot and in so doing contacts the lower bar on the upbeat as when the beat has been divided into two equal parts. An upper bar is adjustably positioned at selected heights above the lower bar and provides a tertiary impact surface. If the beat is divided into three equal parts, the lower bar can be yieldably raised by the toe against the spring force after momentarily registering impact with the lower bar until it encounters the upper bar.

Another feature of this invention is directed to the use of a heel block for facilitating the pivotal foot action. The heel block is removably secured at selected locations to a platform and can be custom adjusted for the student's comfort.

A further advantage of this invention is directed to the construction of the component elements which permits convenient assembly and disassembly for compact storage.

It should also be noted that the student, when using this device, can beat time in a natural manner without concentrating on visual observation or annoying sound timing signals. The toe contact with the resistance bar transmits the "feel" of the musical beat. Consequently, this apparatus will tend to overcome a beginning student's difficulty in creating an upbeat exactly equal in time value to the downbeat.

In view of the foregoing, it should be apparent that the present invention overcomes many of the shortcomings of the prior art devices and provides a musical teaching aid which eliminates many of the problems previously encountered.

Having thus summarized the invention, it will be seen that it is an object thereof to provide a music teaching aid of the general character described herein which is not subject to the aforementioned disadvantages.

Specifically, it is an object of this invention to provide a musical aid for teaching a student to physically sense and accent the pulsations of time or beat without audible time signals.

Another advantage of the present invention is that it is readily adaptable for teaching both duple and triple divisions of time.

Still another feature of this invention is that the component parts can be readily disassembled and the unit is simple in construction, low in cost, reliable in use and well adapted for mass production fabrication techniques.

Other objects, features and advantages of the invention in part will be obvious and in part will be pointed out hereinafter.

With these ends in view, the invention finds embodiment in certain combinations of elements and arrangements of parts by which the objects aforementioned and certain other objects are hereinafter attained, all as more fully described with reference to the accompanying drawings and the scope of which is more particularly pointed out and indicated in the appended claims.

BRIEF DESCRIPTION OF THE DRAWINGS

In the accompanying drawings in which is shown a possible exemplary embodiment of the invention:

FIG. 2 is a perspective view of the music teaching aid with the component elements shown separated, in exploded fashion, for further illustrating the construction;

FIG. 3 is an auxiliary plan view to an enlarged scale wherein is shown a horizontal resistance bar in broken section secured between two support posts;

FIG. 4 is a sectional view taken substantially along line 4—4 of FIG. 3 and illustrating the end securement of an upper and lower resistance bar to the support post and a spring member for acting upon the lower resistance bar; and FIG. 5 is a side elevational view, to a reduced scale, illustrating the operation of the music teaching aid with the displacement of the student's foot and the movement of the lower resistance bar being indicated in phantom lines.

BEST MODE FOR CARRYING OUT THE INVENTION

Figure 1:
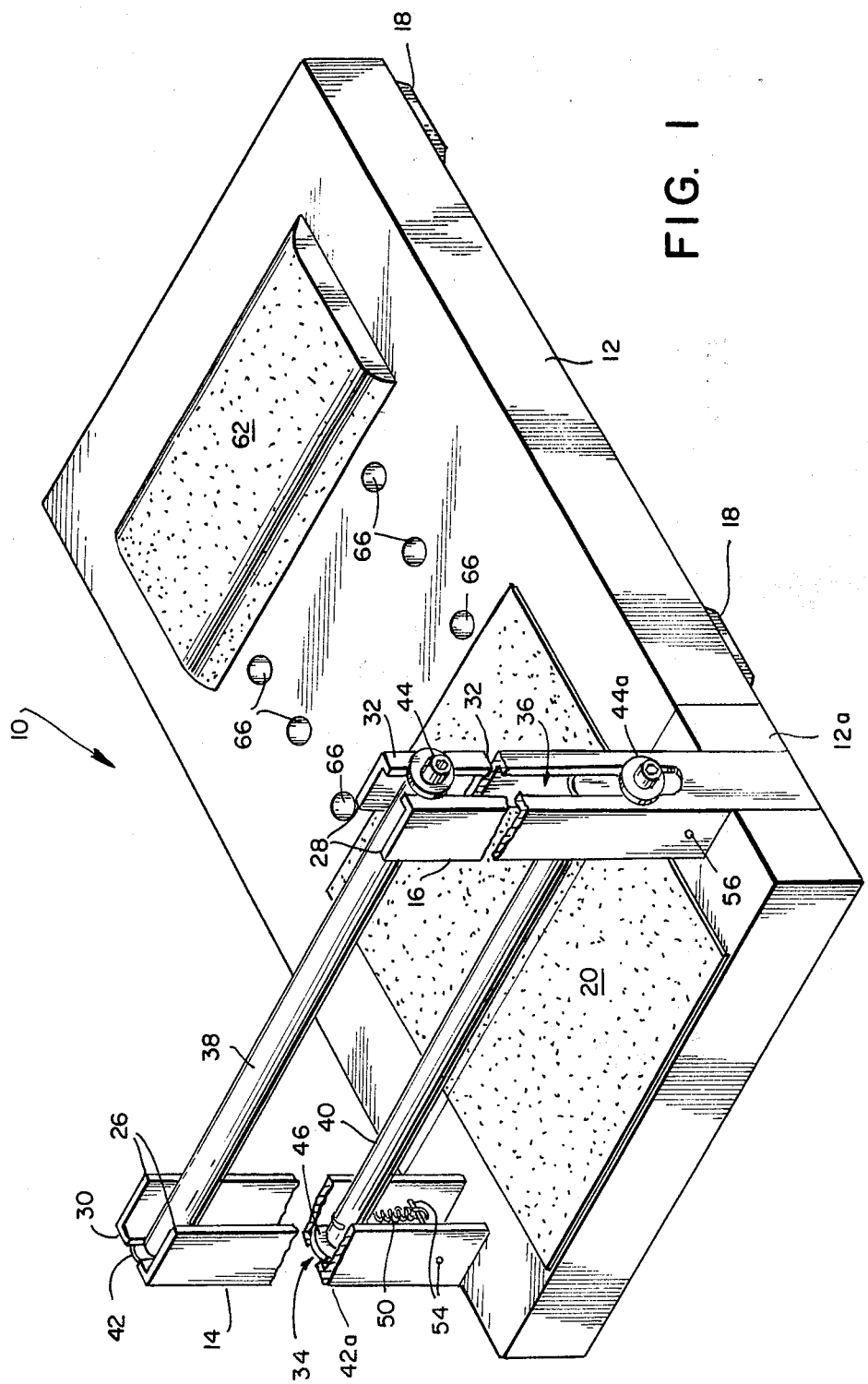
FIG. 1 is a perspective view of a music teaching aid of this invention shown as assembled for student use in dividing a beat into three equal parts or multiples thereof.

Referring now in detail to the drawings, the reference numeral 10 denotes generally a music teaching aid of this invention. The teaching aid 10, as illustrated in FIG. 1, includes a substantially rectangular and planar base plate or platform 12 having a detachable portion or segment 12a. A pair of support posts 14, 16 are each secured to the platform 12 and in particular to the detachable segment 12a. The platform 12 is adapted for placement upon a horizontal support surface such as a floor, and for that purpose a contact pad 18 is placed at each of the corners on the underside of the platform 12.

In this preferred embodiment, the platform 12 is fabricated of a wood laminate and includes a durable outer surface such as Formica. A portion of the upper surface is treated with an abrasive material as commercially available for providing a nonslip and wear-durable toe impact area 20. In addition, a pair of dowels 22 extending from platform 12 are adapted to be received within corresponding registered apertures 24 within segment 12a for interlocking these components (see FIG. 2).

The support posts 14, 16, as shown, are fabricated from a channel shaped section, each having two substantially parallel flanges 26, 28 and a connecting web portion 30, 32. Typically, the channel sections are made of aluminum and are approximately 15 centimeters in length. In addition, the web portions 30, 32 are each provided with an open slot 34, 36 for slidably receiving a pair of resistance bars 38, 40. The bars are fabricated of aluminum rod and are approximately 15 centimeters in length and 9 millimeters in diameter.

The upper resistance bar 38 includes an internally threaded bore at its opposite ends which is adapted for receiving an externally threaded shaft of a pair of respective locking screws with washers 42, 44 as best shown in FIG. 3. The locking screws 42, 44 are provided with a knurled cylinder head and an axial hexagonal hole for receiving an Allen wrench or alternative hand tightening to position the upper resistance bar 38 at any desired location along the slot 34, 36.

The lower resistance bar 40 is similarly slidably suspended within the slotted opening 34, 36, and for this purpose the opposite ends of the bar 40 are provided with a respective channel guide 46, 48 which is made of Teflon and conforms to the width dimension between the flanges 26, 28. The guides 46, 48 are secured to the ends of bar 40 as typically illustrated in FIG. 4 with regard to the guide 48 wherein a protuberance 49 interfits within an internal bore 51.

A pair of helical tension springs 50, 52 are each secured at one end to a transverse pin 54, 56 extending through respective flanges 26, 28; the opposite end of said spring 50, 52 is wrapped over the lower resistance bar 40 as noted in FIG. 4.

Another set of locking screws and washers 42a, 44a are positioned below the respective channel guides 46, 48 and are threaded into respective square head nuts 58, 60 which are slidable between the flanges 26, 28 unless the locking screws 42a, 44a are tightened. It should be obvious that the lower resistance bar 40 can thus be set at a desired elevation and will be firmly held against the tension spring force by tightening the locking screws 42a, 44a.

Turning once again to the platform 12, it should be observed that a heel block 62 has projecting pegs 64 and can be secured at different locations on the platform 12 by insertion of the pegs 64 into selected pairs of receiving holes 66. Furthermore, the surface of the heel block 62 is treated with the abrasive nonslip wear-durable material which is also applied to the toe impact area.

In operation, the component elements of the music teaching aid of this invention are assembled by interlocking the various parts in accordance with the aforementioned description. In so doing, however, the heel block 62 should be positioned such that the student's toe will comfortably rest on the toe impact area 20 and under the lower resistance bar 40.

The lower resistance bar 40 should then be adjusted to a position approximately 2.5 centimeters above the student's toe by manipulation of locking screws 42a, 44a.

When teaching duple time wherein the beat is divided into two equal parts such as 2/4 or 4/4, the upper resistance bar 38 is lowered and placed immediately above the lower resistance bar 40 as noted in FIG. 4. The screws 42, 44 are then tightened to firmly secure the bar 38. It should be appreciated that the bar 40 will now be nonyieldable. The student is then instructed to place his heel on block 62 and to pivot his foot so as to top his toe on the platform 12 while counting aloud "1 and 2 and 3 and 4" etc. The toe should impact with platform 12 on the numeral count or downbeat and impact with the lower resistance bar 40 on the "and" in the counting or upbeat. This exercise should be continued until the foot action is even and smooth. After mastering this beating of time and counting aloud, the student can add his instrument while continuing the exercise.

The next progressive step in the teaching program concerns triple meter or dividing a beat into three equal parts as in triplets or 6/8. For this procedure, the music teaching aid is repositioned by separating the upper resistance bar 38 a distance equal to the spacing between the now yieldable lower bar 40 and the student's toe. In this mode, the time count is as follows: "1, 2, 3, 1, 2, 3". On the first count the toe strikes the platform 12; on the second count the toe strikes the lower resistance bar 40 and then continues upward against the spring force to strike the upper resistance bar 38 on the third count. This sequence is typically illustrated in FIG. 5.

It should thus be seen that the music teaching aid of this invention provides an improved and efficient means for instructing a student in the basic divisions of time and is well adapted to meet the conditions of practical use.

Since various possible embodiments may be made of the present invention and further changes may be made in the exemplary embodiment set forth herein, it is to be understood that all material set forth or shown in the accompanying drawings is to be interpreted as illustrative and not in a limiting sense.

I claim:

1. A music teaching aid for developing a student's understanding of the pulsations of time characteristic of music comprising platform means for receiving a downwardly directed impact force during rhythmic movement of the student's foot, indicating means supported above said platform means, said indicating means providing a secondary impact surface during an upwardly directed movement of the student's foot thereby delimiting the amplitude of foot displacement whereby the student can coordinate said oscillatory movement with basic musical time divisions.

2. A music teaching aid as claimed in claim 1 wherein the indicating means further includes a tertiary impact surface for defining time divisions in triple meter.

3. A music teaching aid as claimed in claim 2 wherein the indicating means includes at least one bar, said bar being adjustably supported in a substantially horizontal orientation above the plane of said platform.

4. A music teaching aid as claimed in claim 2 wherein the indicating means includes an upper and a lower resistance bar and spring means for urging one of said resistance bars toward the platform for providing a yieldable impact surface.

5. A music teaching aid as claimed in claim 4 further including support means extending upwardly from said platform for receiving said resistance bars.

6. A music teaching aid as claimed in claim 5 wherein the support means includes two upstanding posts, said posts being provided with a longitudinal slot, the ends of said resistance bars being adapted for engagement at selected locations along the longitudinal slot for determining the spatial relationship between said bar and the surface of the platform.

7. A music teaching aid as claimed in claim 6 wherein a lower resistance bar is provided with guide members at its opposite ends, said guide members being in cooperative sliding arrangement within said posts.

8. A music teaching aid as claimed in claim 7 further including locking screw means, said locking screw means being insertable through said longitudinal slot for cooperatively engaging said upper resistance bar and firmly securing said bar at a selected elevation above the platform.

9. A music teaching aid as claimed in claim 8 wherein the spring means includes at least one helical tension spring, said tension spring being fixed at one end and having its opposite end secured to said lower resistance bar.

10. A music teaching aid as claimed in claim 8 wherein additional locking screw means are adapted for insertion through said longitudinal slot for engaging said guide member whereby the lower resistance bar can be yieldably positioned at selected elevations above the platform and secured by the locking screws.

11. A music teaching aid as claimed in claim 6 wherein the platform includes a detachable segment, said detachable segment containing said upstanding posts and resistance bars.

12. A music teaching aid as claimed in claim 11 wherein the platform further includes a heel block, said heel block providing a pivot for the student's foot during rhythmical tapping motion.

* * * * *